Figure 1:
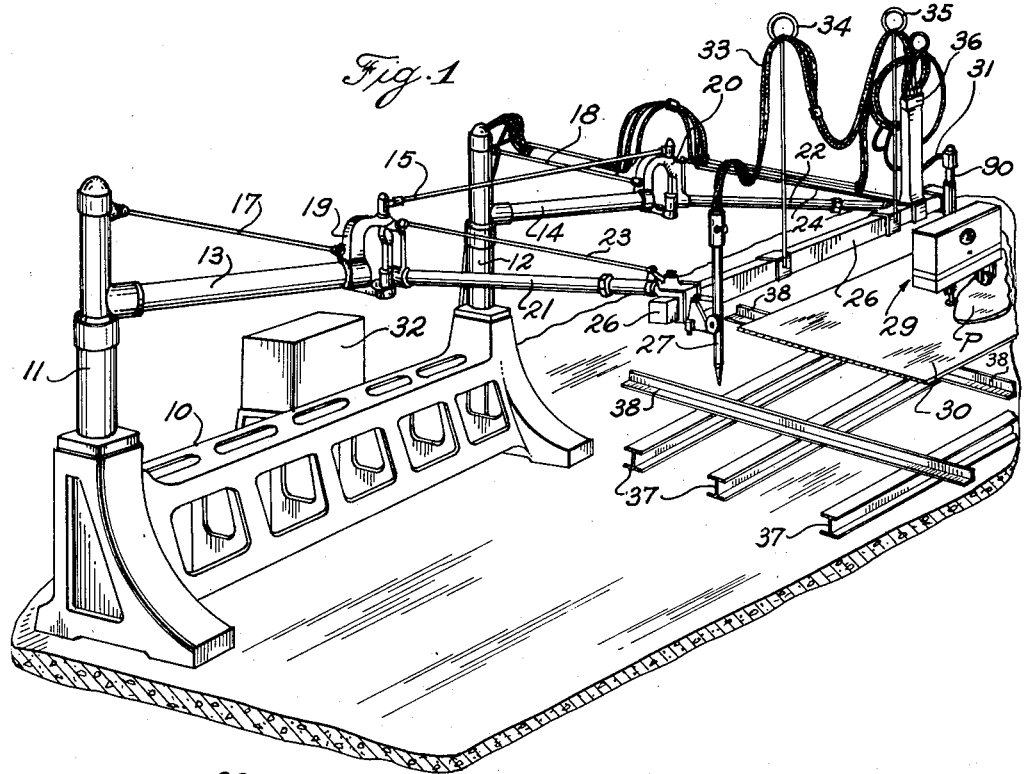

May 18, 1954 W. L. MARTIN 2,678,496
CONTOUR FOLLOWING APPARATUS
Filed Nov. 14, 1949 6 Sheets-Sheet 1

INVENTOR.
WENDELL L. MARTIN

BY Bosworth & Sessions
ATTORNEYS

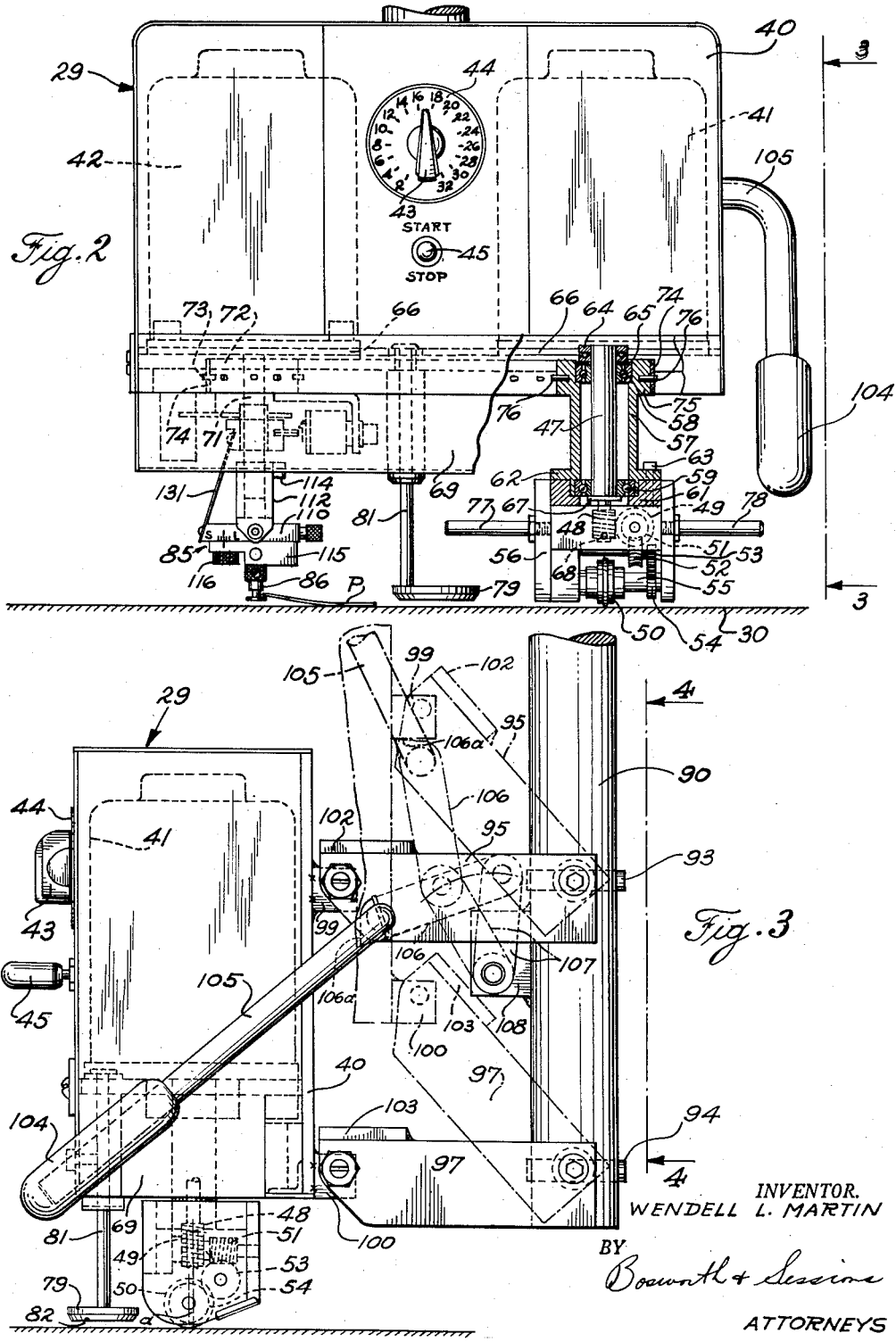

May 18, 1954 W. L. MARTIN 2,678,496
CONTOUR FOLLOWING APPARATUS
Filed Nov. 14, 1949 6 Sheets-Sheet 3
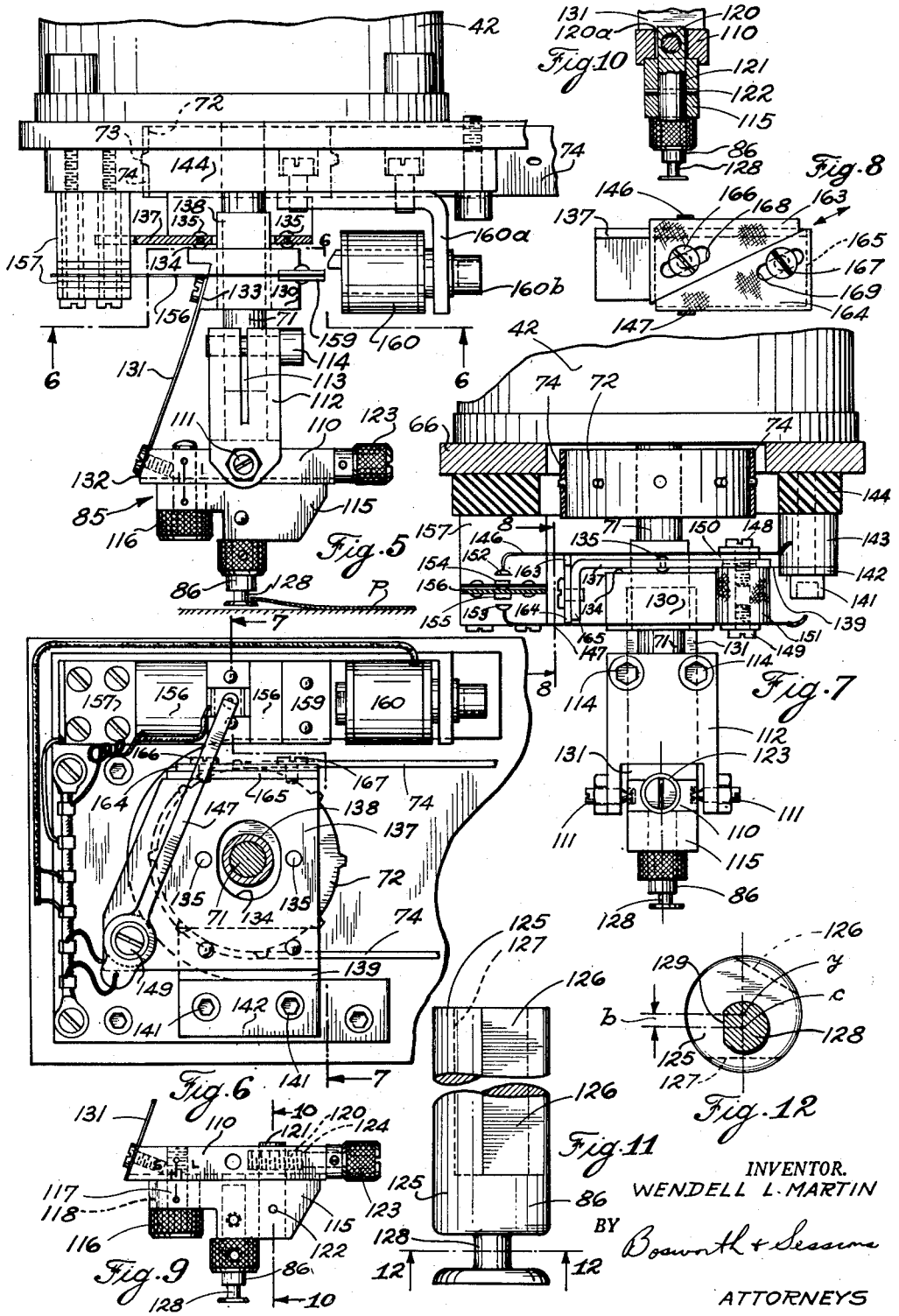
INVENTOR.
WENDELL L. MARTIN
BY
Bosworth + Sessions
ATTORNEYS

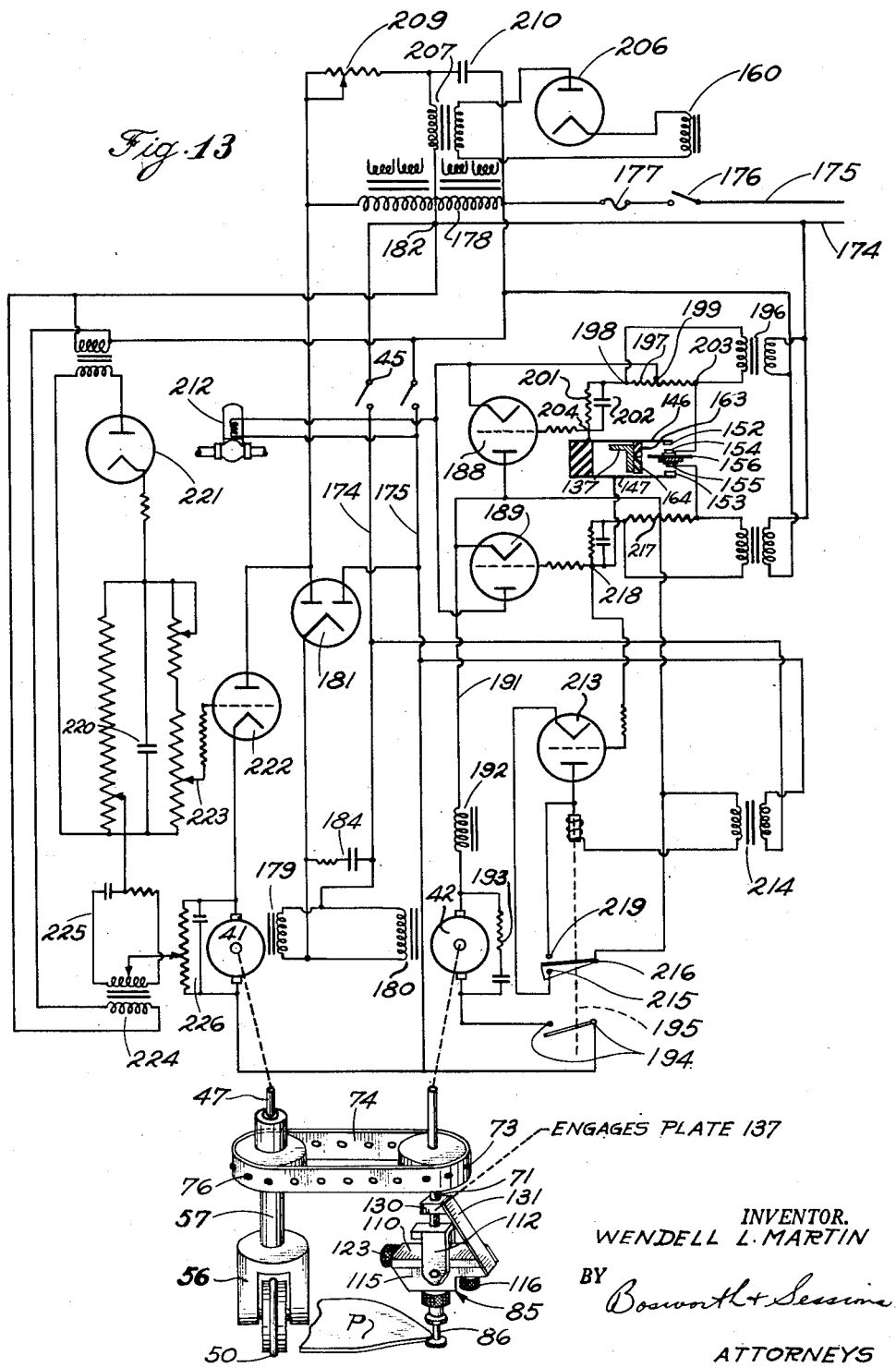

May 18, 1954 W. L. MARTIN 2,678,496
CONTOUR FOLLOWING APPARATUS
Filed Nov. 14, 1949 6 Sheets-Sheet 5
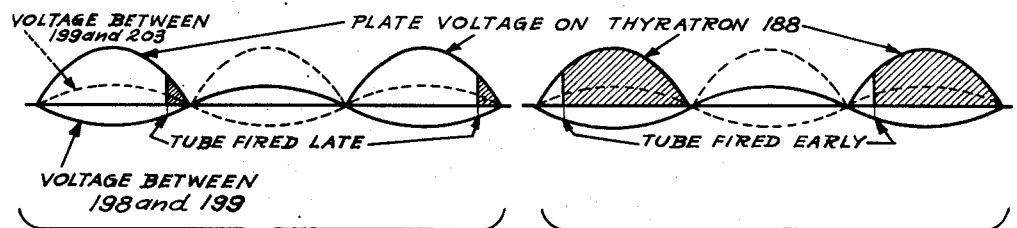
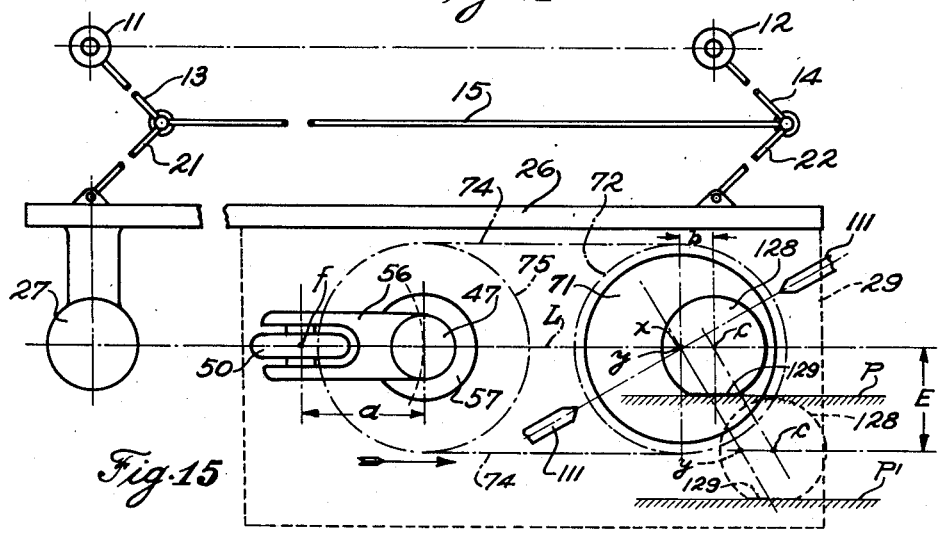
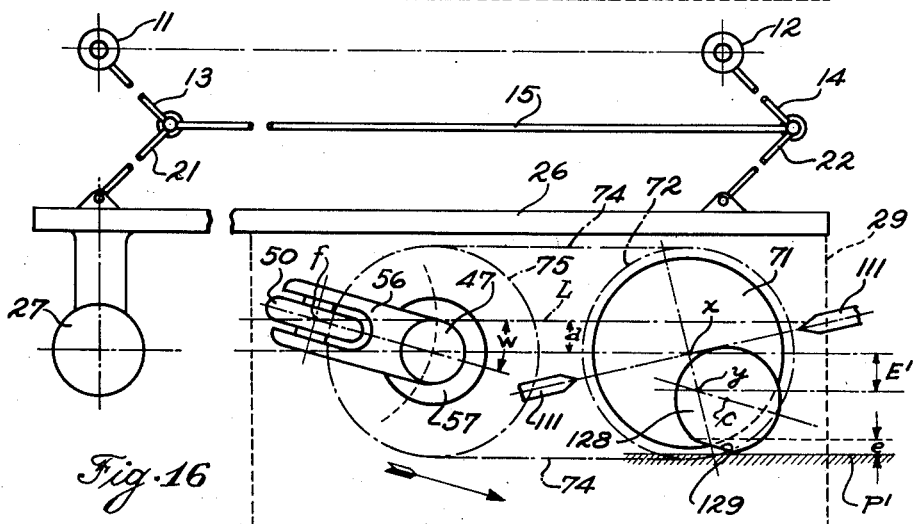
INVENTOR.
WENDELL L. MARTIN
BY
ATTORNEYS INVENTOR.
WENDELL L. MARTIN
BY
Bosworth & Sessions
ATTORNEYS Patented May 18, 1954

2,678,496

UNITED STATES PATENT OFFICE 2,678,496

CONTOUR FOLLOWING APPARATUS

Wendell L. Martin, Shaker Heights, Ohio, assignor to The Martin Brothers Electric Company, Cleveland, Ohio, a corporation of Ohio Application November 14, 1949, Serial No. 127,107

13 Claims. (Cl. 33—23)

This invention relates to contour reproducing apparatus and particularly to apparatus comprising a tracer adapted automatically to follow a contour or pattern, the motion of the tracer being transmitted to a tool such as a cutting torch, for example, which is constrained to follow the same path as the tracer thereby to reproduce the contour or pattern. The present invention constitutes in some respects an improvement on the apparatus disclosed and claimed in my copending application Serial No. 728,223, filed February 13, 1947, and now Patent No. 2,622,871, issued December 23, 1953, to which reference is hereby made, and of which the present application is a continuation in part.

The several aspects of the invention disclosed herein relate to mechanical features of construction of the follower mechanism, including the apparatus for driving and steering the follower or tracer, to the electrical apparatus and circuits for controlling the follower mechanism and supplying the necessary electrical impulses for steering the tracer along the contour and to a method for controlling the follower mechanism to cause it accurately to trace the pattern, contour or the like. The present specification discloses a preferred form of the invention adapted for use with a flame cutter of generally conventional design and construction. It is to be understood, however, that the invention may be adapted for various other uses and purposes, and that changes and modifications may be made in the preferred form of the invention disclosed herein without departing from the spirit and scope of the invention.

A general object of the present invention is the provision of a contour following apparatus which is adapted rapidly and accurately to trace or reproduce a contour, pattern or the like. Another object is the provision of such an apparatus which is sturdy and substantially foolproof in operation, which can be manufactured at reasonable cost, which requires no particular skill on the part of the operator and which is so constructed that it can be used under the generally severe operating conditions which ordinarily obtain in metal working shops, mills, structural iron works and the like wherein machines of this character find their greatest fields of usefulness. Other objects of the invention include the provision of a simple and sturdy contour following apparatus which can readily be adapted to cutting and welding machines of conventional designs; the provision of a contour follower and method of following contours capable of accurately reproducing at high operating speeds patterns embodying abrupt turns without requiring modification of the pattern; the provision of a machine adapted to manual tracing as well as automatic tracing; the provision of an automatic contour following apparatus embodying a simple adjustment for compensating for the width of the cut made by the torch or other cutting apparatus with which the machine is used, whereby the resultant workpiece may be made accurately and of the same size as the original pattern with varying widths of cut.

Figure 4:
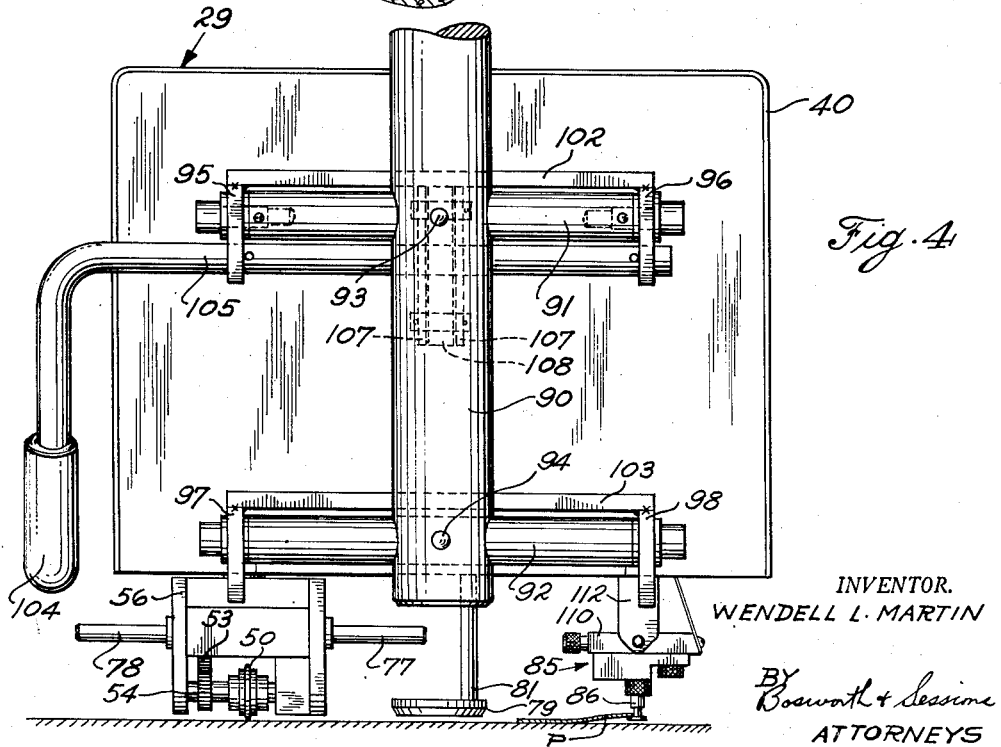

Further objects and advantages of the invention will become apparent from the following description of a preferred form thereof, reference being made to the accompanying drawings, in which Figure 1 is a perspective view illustrating a generally conventional flame cutting apparatus of the pantograph type incorporating a preferred form of my contour follower; Figure 2 is a front elevational view on an enlarged scale showing the contour follower of Figure 1; Figure 3 is an end elevational view taken as indicated by line 3—3 of Figure 2; Figure 4 is a rear elevational view of the contour follower taken as indicated by the line 4—4 of Figure 3; Figure 5 is an enlarged elevational view of the tracer mechanism of the follower; Figure 6 is a view looking upwardly at a portion of the tracer control mechanism, the view being taken along the line 6—6 of Figure 5; Figure 7 is a vertical sectional detail of the tracer mechanism taken as indicated by the line 7—7 of Figure 6; Figure 8 is a detail showing the adjustment for the contacts for the vibrating reed employed in the tracer; Figure 9 is a detail of the tracer head illustrating the adjustment for kerf width; Figure 10 is a sectional detail taken along line 10—10 of Figure 9; Figure 11 is a greatly enlarged detail of the pattern engaging tracer; Figure 12 is a section taken as indicated by line 12—12 of Figure 11; Figure 13 is a wiring diagram of a preferred circuit arrangement for controlling the apparatus; Figure 14 is a diagram showing the plate and control voltages in the thyratron tubes that are preferably employed to supply power to the steering motor; and Figures 15, 16, 17 and 18 diagrammatically illustrate the steering action of the apparatus.

General arrangement

Referring to Figure 1 of the drawings, a typical flame cutting apparatus to which my invention may be readily adapted comprises a heavy base member 10 resting on the shop floor as shown and having upwardly projecting supporting members 11 and 12 at either end thereof. These members carry, on suitable antifriction bearings, horizontally extending arms 13 and 14, the arms being interconnected at their ends remote from the supports 11 and 12 by a link 15 so that the arms are constrained to remain parallel to each other at all times in their pivotal movement on the supports 11 and 12. The arms are further supported against vertical deflection by tension members 17 and 18.

Arms 13 and 14 carry brackets 19 and 20, respectively, which support another pair of parallel arms 21 and 22, these arms likewise being mounted in the brackets 19 and 20 by antifriction bearings, and tension members 23 and 24 being provided to prevent vertical deflection of the outer ends of the arms.

The outer ends of arms 21 and 22 are connected by a square supporting bar 26 which is parallel to the connecting link 15 and has the functions of constraining the arms 21 and 22 to remain parallel to each other at all times thus completing the pantograph assembly, and of providing a support for one or more torches 27 or other appropriate cutting tools as well as a support for the pattern following apparatus indicated in general at 29. The pattern following apparatus, as will be described in detail below, operates automatically to follow a pattern P disposed on the pattern support 30, and in so following the pattern to cause the torch 27 to follow a path corresponding to the shape of the pattern. In conventional cutting apparatus of the general type just described, a manually steerable driving unit is ordinarily mounted where the tracer following apparatus 29 is shown in Figure 1. Thus, in order to incorporate the present invention in a conventional cutting apparatus, it is only necessary to substitute the apparatus 29 for the usual manually controllable apparatus.

The required electrical connections from the apparatus 29 to the necessary power supply and other electrical control circuits are made through cable 31 which is led along tension members 24 and 18 to the support 12 and thence to the control box 32 which may be disposed at any convenient location. Flexible hoses indicated collectively at 33 are led from the torch 27 through appropriate supports 34, 35 and 36 carried by the bar 26, and extend along tension members 24 and 18 to the supporting post 12, and thence to appropriate sources of the gases required for operation of the torch.

The work may be supported beneath the torch in any convenient manner, for example, by a structure made up of the longitudinally extending I-beams 37 and transversely extending angle irons 38.

Pattern following apparatus

The pattern following apparatus indicated in general at 29 in Figure 1 is shown on an enlarged scale in Figures 2, 3 and 4. The apparatus is enclosed within a housing 40, the housing containing a driving motor 41 which serves to propel the apparatus along the pattern and a steering motor 42 which controls the direction in which the apparatus is driven by the driving motor. A speed control switch 43 for the driving motor is mounted on the front face of the housing, the dial 44 being calibrated in inches per minute in the example shown in the drawings. A switch 45 for starting and stopping the apparatus is also mounted on the front face of the housing.

*Driving mechanism.*—In order to propel the apparatus around the pattern, the vertical shaft 47 of the driving motor is extended downwardly toward the pattern support 30 and terminates in a worm 48. The worm 48 engages worm wheel 49, and a driving connection is made to the friction driving wheel 50 through worm 51, worm wheel 52 and gears 53 and 54, the gear 54 being mounted on the shaft 55 which supports the driving wheel 50. The several worms, worm wheels and gears are carried by suitable shafts mounted on appropriate bearings in the housing 56 for the drive wheel 50. It is to be noted that the axis of the drive wheel and its point of contact with the pattern are preferably offset from the axis of the shaft 47 as indicated by the dimension $a$ in Figure 3; this slight offset improves the accuracy of the steering control as explained in detail below.

The housing 56 is supported for rotation about the axis of the shaft 47 in order to make it possible for the driving wheel 50 to drive the apparatus in any desired direction. The rotatable mounting of the housing 56 is accomplished through the spindle housing 57 which is supported coaxially with the shaft 47 by radial ball bearings 58 and 59 at the upper and lower ends of the spindle housing, respectively. The horizontal top plate 61 of the drive wheel housing 56 engages flange 62 of the spindle housing and is secured to the flange by screws 63 so that the housing 56 is constrained to rotate about the axis of the shaft 47 with the spindle housing 57.

In order to take the thrust load due to the weight of the apparatus 29 on the driving wheel 50, a thrust bearing 64 is provided immediately above the radial bearing 58. The bearing 58 is disposed within an enlargement 65 at the upper end of the spindle housing 57, and the thrust bearing 64 is supported by the frame of the motor 41. Motors 41 and 42 are both bolted to the base plate 66 of housing 40. The entire assembly of spindle housing, bearings and drive housing is retained on the motor shaft 47 against downward displacement by means of the washer 67 which in turn is held in position by worm 48 which is pinned to the motor shaft by drive pin 68. The housing 40 has a depending skirt portion 69 (partly broken away in Figure 2) which shields the spindle housing 57 and also portions of the tracer head mechanism.

Those skilled in the art will understand that where the cutting tool or other apparatus to be propelled around the contour is especially heavy or requires more force to propel it than can be conveniently developed by a single driving wheel, two or more driving wheels, mounted on rotatable spindles, can be employed; in such an installation the driving wheels are preferably driven in synchronism by a single motor through a belt or other suitable means, and also are steered in synchronism by a belt or other suitable means.

*Steering mechanism.*—In order to steer the driving wheel 50, the shaft 71 of the steering motor 42 is provided with a sheave 72 having radially projecting pins 73 and arranged to drive the perforated belt 74 (see Figures 2 and 6) which also engages the sheave portion 75 of the spindle housing 57. The sheave portion 75 likewise has pins 76 for engaging the perforations of the belt 74; thus, the belt is prevented from slipping with respect to the sheave, and inasmuch as the belt is substantially free from stretch under the loads imposed upon it and is maintained under slight tension between the sheaves 72 and 75, the connection from the steering motor to the spindle housing 57 is substantially free from backlash, requires no lubrication and has very low inertia, making the response of the apparatus very quick.

Handles 77 and 78 are secured to the drive wheel housing 56 to provide for manual steering of the apparatus, manual steering being useful in directing the apparatus toward the pattern to be followed and under circumstances where automatic operation is not required. Also, in order to adapt the device for manual tracing, a tracing stylus 79 is supported slightly above the pattern support 30 by a rod 81 depending from the base plate 66 of the housing. The manual tracing stylus 79 comprises a piece of clear plastic having an opaque dot 82 (see Figure 3) in the lower surface thereof which makes it possible for an operator manually to steer the apparatus around a pattern with a reasonable degree of accuracy.

In order to provide for automatic steering of the apparatus around a pattern or contour, a tracing head, indicated in general at 85 is supported on the depending shaft 71 of the steering motor 42 so that the tracing head is steered simultaneously with the drive wheel 50. The tracing head terminates in a tracer proper 86, shown in detail in Figures 11 and 12 and to be described more fully below, which is arranged to engage the edge of the pattern P mounted on the pattern support 30. The arrangement is such that through suitable electrical circuits to be described in detail below, the steering motor is controlled to steer the drive wheel 50 to cause the tracer to follow around the pattern P with the tracer 86 lightly engaging the edge of the pattern and with the locus of the center of the shaft 71 spaced away from the edge of the pattern a distance substantially equal to one-half the width of the kerf cut by the torch. Inasmuch as the parallel linkage mechanism of the flame cutting apparatus constrains the torch 27 to take the same path as the tracing apparatus 29, it will be evident that the torch will follow a path determined by the configuration of the pattern P and hence will cut along a line determined by the configuration of the pattern P.

*Mounting of pattern following apparatus.*— As noted above, the weight of the entire pattern following apparatus 29 rests on the driving wheel 50 when the device is in use. In order to hold the apparatus in proper relationship to the pantograph and also to provide for lifting the driving wheel 50 out of engagement with the pattern support 30 when it is desired to move the apparatus manually, the apparatus 29 is connected to the bar 26 by the mechanism shown particularly in Figures 3 and 4. This mechanism comprises a vertical bar 90 which may be clamped to bar 26 to hold apparatus 29 in any desired angular position with respect to bar 26. Bar 90 has vertically spaced horizontal bars 91 and 92 extending through it, the bars 91 and 92 being locked in position by pins 93 and 94. The pattern following apparatus 29 is supported through pairs of parallel links 95 and 96 and 97 and 98 which are pivotally mounted on the ends of bars 91 and 92, respectively. The opposite ends of the links 95 and 97 are pivotally secured to brackets 99 and 100 (see Figure 3) which are welded to the back of the housing 40. The corresponding ends of links 96 and 98 are pivoted to similar brackets. Links 95 and 96 are secured together by a longitudinally extending horizontal bar 102 disposed at the ends of the links near the housing 40 and links 97 and 98 are secured together by a similar bar 103. The mechanism just described thus retains the tracer apparatus and housing 40 in fixed relationship to the pantograph apparatus insofar as any substantial displacement in horizontal directions is concerned, and at the same time permits the housing to move vertically with respect to the pantograph apparatus, thus enabling the drive wheel 50 to run without difficulty over any slight irregularities in the pattern support or pattern.

In order to lift the pattern following apparatus 29 to disengage the driving wheel 50 from the pattern support, a handle 104 projects from the back of the housing to a position adjacent the front thereof and is provided with a transversely extending portion 105 which is pivotally supported by aligned openings in links 95 and 96. A lifting link 106 is pinned to the central part of the transversely extending portion 105. The other end of the link 106 is pivotally connected to toggle link 107 which in turn has its other end pivoted to the bracket 108 which is welded to the vertical bar 90. By reference to Figure 3, it will be seen that when the end of the handle 104 is raised by the operator, the tracing apparatus 29 will be raised, the handle 104, housing 40 and the links 95 and 97 taking the positions shown in broken lines in Figure 3. It will be noted that the toggle made up of links 106 and 107 is over center when the parts are in raised position with the lug 106a engaging bracket 99 and thus retaining the tracing apparatus 29 in raised position. The length of the handle is such as to give considerable mechanical advantage so that the apparatus can be raised and lowered by the operator without difficulty.

*Tracer head*

The steering motor is controlled to steer the driving wheel 50 to cause the tracer 86 to remain in contact with the pattern P through electrical circuits described in detail below; the circuits are controlled by the tracer head indicated in general at 85 and shown particularly in Figures 5 to 10, inclusive, of the drawings. As there shown, the tracer head 85 comprises a block 110 mounted in trunnions 111 carried by the yoke 112 which is split as at 113 and clamped to the downwardly extending shaft 71 of the steering motor 42 by means of screws 114. Thus, the block can rock with respect to the shaft about the axis of the trunnions, but it is constrained to rotate about the axis of the shaft with the shaft 71. It is to be noted that for convenience of illustration the axis of the trunnions is shown as parallel to the plane of the drive wheel 50. Actually, the axis of the trunnions is preferably rotated about 30° from this position, for reasons which are explained below.

A slide 115 is guided for adjustment along block 110 and is secured to block 110 by thumb screw 116, see Figures 5 and 9, the shaft 117 of the thumb screw passing through an enlarged opening 118 in the slide 115 so that when the thumb screw is loosened the slide may be moved longitudinally of the block 110 by means of the adjusting screw 120 disposed in slot 120a in block 110. The screw 120 passes through and makes threaded engagement with the rod 121 (Figure 10); the rod 121 is secured in a recess in the slide 115 as by pin 122 and moves in slot 120a in block 110. Inasmuch as the adjusting screw 120 is held against longitudinal movement with respect to block 110 by engagement of the head 123 with the end of the block 110 and by engagement of the enlarged threaded portion of the screw with the internal shoulder 124 of the block, rotation of the adjusting screw 123 adjusts the slide 115 longitudinally of the block. This adjustment provides for compensation for the width of the kerf cut by the torch inasmuch as the movement of the slide is generally transverse to the direction of movement of the apparatus along the pattern, the axis of the trunnions 111 being disposed at an angle of about 30° to the plane of the driving wheel 50.

The actual engagement between the pattern and the apparatus is through the tracer 86 which is mounted in the block 115. As shown in Figures 11 and 12, the shank portion 125 of the tracer or stylus has flats 126 and 127 on the sides thereof for holding it against rotation in the block, and the shank is locked in position by set screws, pins or the like. The engagement between the edge of the pattern and the tracer 86 is with the reduced portion 128 of the tracer. As shown in Figure 12, this portion is circular in cross-section except for a flat side 129 extending parallel to the direction of movement of the tracer, i. e., at an angle of 30° to the axis of the trunnions and parallel to the plane of the driving wheel 50. Small radii, not shown in the drawing are provided where the flat surface 129 intersects the round surface. It will be noted from Figure 12 of the drawings, that the center $c$ of the round reduced portion 128 of the tracer does not coincide with the axis $x$ of the motor shaft 71 but is displaced in the direction of movement of the assembly by an amount indicated by the dimension $b$ in Figure 12 and may be displaced toward the pattern; in a typical installation dimension $b$ may be about 0.025 inch; the displacement toward the pattern may be about 0.010 inch, the effective displacement toward the pattern may be adjusted by slide 115 as described above to compensate for the width of the kerf cut by the torch. Point $y$ is the point in the pattern engaging portion that coincides with the axis $x$ of the motor shaft when the tracer head is in the neutral or null position, i. e., when the center $x$ of the motor shaft is in the correct position with respect to the pattern. Point $y$ is disposed toward the rear of portion 128, approximately in alignment with the rear edge of the flat surface 129. The lateral position of point $y$ in portion 128 varies, depending upon the adjustment of the slide 115 for kerf width. As will appear from the detailed description of the operation of the device, this shape of the tracer in combination with the offset of the drive wheel from the axis of the driving motor, which offset is indicated by dimension $a$ in Figure 3, cooperate to give stable and accurate response of the device to turns, corners and curves in the pattern, enabling the apparatus to follow the pattern accurately at high cutting speeds without requiring special compensation of the pattern.

It will be evident that changes in the force exerted by the edge of the pattern against the tracer 86 will cause the tracer head 85 to rock about the trunnions 111. It is this rocking motion that is used to control the steering motor 42 and thus to steer the driving wheel 50 so as to cause the apparatus to follow the pattern; the steering apparatus functions to maintain the relationship between the center line of the shaft 71 of the steering motor and the edge of the pattern substantially constant, only very slight pivotal movements of the tracer head 85 being required to effect the operation of the control.

The pivotal movements of the tracer head 85 are translated into vertical movements of the collar or bushing 130 which is slidably mounted on the motor shaft 71 above the yoke 112. This is accomplished by connecting the slide 110 and the collar by a link 131 which is in the form of a thin flat spring (see Figure 5). The ends of the connecting spring 131 are clamped to the beveled end surface 132 of the slide 110 and to the obliquely extending flat surface 133 of the collar 130, the angles of these surfaces being such that when the spring is straight the tracer head 85 and tracer 86 are urged toward the pattern; i. e., in the embodiment shown in Figure 5 of the drawings, the spring link 131 tends to rotate the tracer head 85 about the trunnions in a counterclockwise direction and thus urges the tracer 86 lightly against the edge of the pattern. In this figure, the tracer head is shown held in a position with the axis of the tracer 86 vertical and parallel to the axis of the shaft 71 by engagement of the tracer with the edge of the pattern P; this preferably is the neutral or null position in which the apparatus does not give the steering motor a dominant signal to turn in either direction.

As shown in Figures 5 and 7, the upper surface 134 of a shoulder formed on the collar 130 engages the heads of small brass rivets 135 which are secured in the actuator plate 137 which surrounds the shaft 71 and the sleeve portion 138 of collar 130 (see Figure 6). The actuator plate 137 is held in position by a flat spring 139 which is secured to the plate 137 and is clamped as by screws 141 and plate 142 to the block 143 which engages the insulating base 144, the base being clamped in turn to the base plate 66 of the housing 49. The shape of spring 139 is such that it urges the actuator plate 137 downwardly so that spring 139 and the weight of the actuator plate both cause the rivets 135 to bear downwardly on the shoulder 134 of the collar 130, thus augmenting the tendency of the link spring 131 to urge the tracer 86 against the pattern P.

Thus, if the axis of the motor shaft 71 moves outwardly away from its normal position with respect to the edge of the pattern, the spring link 131 and the action of the actuator 137 urging the collar downwardly will cause the tracer head 85 to pivot about the trunnions in a counterclockwise direction in Figure 5 resulting in a lowering of the collar 130 and the actuator plate 137 along the motor shaft 71. Conversely, if the relationship changes so that the edge of the pattern rotates the tracer head 85 about the trunnions in a clockwise direction, the collar 130 will be moved upwardly by the spring link 131 and the actuator plate 137 will likewise be moved upwardly against the action of the spring 139. Slight changes in the position of the axis of the motor shaft with respect to the edge of the pattern thus result in slight rotational movements of the tracer head 85 about the trunnions, and these rotational movements are translated into upward and downward movements of the actuator plate 137. These upward and downward movements of the actuator plate are utilized to control the steering motor to steer the apparatus to cause the tracer to follow the pattern and to maintain the relationship between the axis of the steering motor and the edge of the pattern substantially constant except for the very slight movements required to effect the control.

*Vibrating reed and contacts.*—Control of the steering motor is carried out by means of electrical circuits, a preferred form of which is described below. The required impulses for controlling the electrical apparatus are derived from movements of the actuator plate 137 and the spring contact fingers 146 and 147 (Figure 7). These contact fingers are clamped at one end by screws 148 and 149 to the actuator plate 137, insulating bushings 150 and 151 being provided to space the fingers from the plate. The opposite ends of the contact fingers are bent toward each other as shown, and terminate in contacts 152 and 153 which are arranged to engage contacts 154 and 155 of vibrating reed 156. Contacts 154 and 155 are insulated from the reed and from each other and, like contact fingers 146 and 147, are connected to the control circuit through wires such as those illustrated in Figure 6. One end of the reed 156 is supported by insulating blocks 157 secured to the insulating base 144; the opposite end of the reed, which is weighted by ferrous plates 159 in order to give the reed the desired natural frequency of vibration, is disposed adjacent the pole piece of the coil 160, the coil being energized to cause the reed to vibrate at the frequency of the A. C. power supply used to operate the apparatus. The operation of the electrical control system is described in detail with reference to the wiring diagram which constitutes Figure 13 of the drawings. For present purposes, it will suffice to say that movement of the actuator plate 137 up or down as a result of rocking movement of the tracer head 85 changes the relationship between the contacts 152 and 153 of the contact arms 146 and 147 and the contact points 154 and 155 of the vibrating reed 156. The change in these relationships is utilized to control the steering motor to bring the apparatus back to the neutral position shown in the drawing.

*Adjustment of contacts.*—In order to maintain the contacts 152 and 153 in proper position with respect to the vibrating reed and to provide for adjustment thereof, the inward movement of the contact fingers toward each other is limited by insulators 163 and 164 which are secured to the downwardly turned end 165 of the actuator plate 137 by screws 166 and 167 operating in inclined slots 168 and 169 in the insulators. The engaging surfaces of the insulators are correspondingly inclined as shown in Figure 8. By means of these insulators, the spacing of the contacts 152 and 153 with respect to the contacts 154 and 155 can be adjusted accurately, and the sensitivity and response characteristics of the apparatus can be varied.

It will be understood that in operation the amplitude of the vibration of the reed 156 is great enough so that with the ordinary adjustment, the contact 154 engages the contact 153 and the contact 155 engages the contact 153 during the latter part of each cycle of vibration even when the apparatus is in the neutral or null position with the tracer in the desired relationship to the edge of the pattern. The action of the reed lifts the resilient contact fingers out of contact with the insulators 163 and 164 momentarily during each cycle. The duration of contact between the contacts 152 and 154 and 153 and 155, of course, varies with the position of the actuator plate 137. Raising the actuator plate 137 increases the duration of contact between contacts 153 and 155 and reduces the duration of, or even entirely eliminates, contact between contacts 152 and 154; lowering of the actuating plate 137 has the opposite effect.

Electrical circuits

*Steering control.*—The circuits shown in the wiring diagram constituting Figure 13 of the drawings translate the changes in relationship between the contacts 152 and 153 and the contacts 154 and 155 on reed 156 into impulses which control the operation of the steering motor 42. The control circuit is so arranged that when the engagement between the template or pattern and the tracer 86 rotates the tracer head 85 in a clockwise direction as shown in Figure 5, and thus raises the collar 130 and actuator plate 137, contact 153 is moved closer to contact 155; this advances the instant of engagement of these contacts in each cycle of vibration of the reed and energizes the steering motor to cause it to turn the drive wheel in a direction to steer the tracer away for the center of the pattern, thus permitting the spring 139 to return the tracer head to its normal position and at the same time return the contacts 152 and 153 to their normal positions with respect to the reed. When the tracer moves away from the pattern so that the tracer head 85 is rotated in a counterclockwise direction by the springs 131 and 139, the collar 130 and actuator 137 are lowered; the closer positioning of contact 152 to contact 154 results in energization of the steering motor to steer the driving wheel in the opposite direction, i. e., toward the center of the pattern.

These results are preferably obtained through electrical circuits such as shown in Figure 13 in which the single phase A. C. power supply lines 174 and 175 are connected through the on-off switch 176 and fuse 177 to transformer 178. The primary of transformer 178 is one section of a center tapped winding arranged to supply full-wave rectified current to the fields 179 and 180, resectively, of the drive and steering motors 41 and 42. The A. C. supply is rectified by the full-wave rectifier tube 181 which is connected with its plates to the outside terminals of the winding containing the primary of transformer 178 and with its cathode connected to the two fields in parallel and to the center tap 182 of the transformer. A smoothing filter 184 is connected across the fields and start-stop switch 45 is arranged to disconnect one plate and the cathode circuit of tube 181 with the result that the fields are energized only while the machine is in operation with switch 45 closed.

In order to energize the armature of steering motor 42 to cause the motor to rotate in the desired direction to provide proper steering control, the power for the armature of motor 42 is supplied through thyratrons 188 and 189. These are connected in inverse parallel, the cathode of tube 188 and the plate of tube 189 being connected to line 174, while the plate of tube 188 and the cathode of tube 189 are connected to line 191 leading to the armature of motor 42 through current limiting reactor 192. A filter 193 is connected across the armature, and the return to line 175 is through contacts 194 of magnetic switch 195. Therefore, when tube 188 is conductive, the direction of current flow through the armature of motor 42 is opposite to that when the tube 189 is conductive, but the energization of the field remains the same. Thus, the direction of rotation of the armature of the steering motor is determined by the tubes, and the power applied to the steering motor is dependent upon the point in the positive half cycles of plate current applied to the respective tubes at which the tubes become conductive. The firing of the tubes is controlled by the amount the tracer 86 is moved from its neutral or null position which in turn controls the position of the contacts 152 and 153 with respect to the contacts 154 and 155 on the reed.

The control of the firing of the tubes is accomplished as follows: Considering first the control circuits for tube 188, the primary of isolating transformer 196 is connected across lines 174 and 175. The secondary of transformer 196 is connected across resistor 197. The voltage between points 198 and 199 of the resistor is applied to the control grid of thyratron 188 so long as the contacts 152 and 154 are not in engagement with each other. This voltage is negative to the plate voltage of tube 188 as indicated diagrammatically in Figure 14. However, the voltage between points 199 and 203 of the resistor 197 is opposite in phase to the voltage between points 198 and 199, and inasmuch as contact 154 is connected to point 203 and contact 152 is connected through contact finger 146 and point 204 to the grid of tube 188, the tube will be fired as soon as contact 154 touches contact 152 because the voltage at point 203, which is in phase with the plate voltage, will then be applied to the grid of thyratron 188. Resistor 201 serves to limit current flow when contacts 152 and 154 are closed and capacitor 202 stabilizes the control grid voltage.

As shown in Figure 14, the voltage between the points 199 and 203 is in phase with the plate voltage of thyratron 188. Reed 156 is caused to vibrate in synchronism with the A. C. supply and is synchronized to approach contact 152 during the positive half cycle of plate voltage on tube 188. Therefore, if finger 146 is held some distance away from reed 156 by engagement with insulator 163, then contact will be made between contacts 152 and 154 only at the extreme end of the swing of reed 156. Thus, the tube 188 will fire late in the positive half cycle, this condition being shown in Figure 14A.

On the other hand, if insulator 163 is lowered by counterclockwise rotation of the tracer head 85 to position contact 152 closer to reed 156, contacts 154 and 152 will come into engagement early in the swing of reed 156 toward contact 152, and tube 188 will be fired early in the positive half cycle of plate voltage, this condition being shown in Figure 14B.

In the first instance, with tube firing late as shown in Figure 14A, only a small amount of energy will be supplied to the motor, whereas in the second instance, with the tube firing early in the positive half cycle, a much larger amount of energy will be supplied. Thus, the amount of energy supplied to the armature of the motor through the tube 188 is determined by the position of finger 146 with respect to the reed, and this position, as previously described, is determined by the engagement between the tracer 86 and the pattern. In the embodiment shown in the drawings, the arrangement is such that energization of the armature of the motor 42 through tube 188 causes the steering motor to rotate to steer the driving wheel and tracer mechanism in a direction toward the center of the pattern. The point in the cycle at which the tube fires is earlier the greater the displacement of the tracer head from null position; therefore the magnitude of the correcting forces varies with the amount of displacement, a small error producing small correcting impulses and a large error applying the full power of the steering motor.

The operation of tube 189 is the same as that described with respect to tube 188, but tube 189 is energized on opposite half cycles from tube 188, and the energization of tube 189 is controlled by contacts 155 on the reed and 153 on the finger 147. Inasmuch as the position of fingers 146 and 147 with respect to the reed 156 is determined by their engagement with the insulating blocks 163 and 164, one of the fingers is moved toward the reed 156 while the other finger is moved away by a like amount in response to movements of the tracer head 85. Thus, as the fingers move with respect to the reed to increase the energy supplied to the armature through tube 188, the energy supplied through tube 189 is simultaneously decreased, the tube 189 ceasing to fire at all when the firing of tube 188 is materially advanced. Movement of the contact fingers in the opposite direction increases the energy applied through tube 189 and decreases and soon cuts off the application of energy through tube 188. In the preferred adjustment of the contacts, energization of the motor through both tubes is substantially equal in the null position and takes place late in the cycle with the result that the motor remains stationary. The action of the control is very smooth because the correcting impulses are proportional to the displacement.

*Vibrator control.*—In order to vibrate reed 156 in synchronism with the A. C. power supply, the coil 160 is energized by half-wave rectifier 208 which is connected to the secondary of transformer 207. (This circuit is shown near the top of Figure 13 for convenience of illustration; it will be understood that the coil 160 is actually disposed adjacent reed 156.) In order to adjust the action of the reed, the coil is adjustably mounted with respect to the reed on bracket 160a by screw 160b (see Figure 5) so that the amplitude of vibration can be controlled, and the primary of transformer 207 is connected across transformer 178 through a phase shift control circuit embodying adjustable resistor 209 and condenser 210. The phase of the current energizing coil 160 can be controlled by adjusting resistor 209. By retarding the phase of the coil and hence the cycle of vibrations of the reed 156, the amount of response around the neutral or null zone is lessened because the contacts on the reed and on the fingers 146 and 147 will come into engagement with each other later in the cycle of the voltage applied to thyratrons 188 and 189. This gives smooth operation around the null point. Where it is desired to have the steering motor give an immediate and stronger response, for example, when a heavy cutting apparatus must be moved, then the phasing of the energizing current for the coil 160 may be advanced until it is in phase with the plate supply for the thyratrons 188 and 189. The character of the response can also be adjusted by adjusting the space between the fingers 146 and 147 by means of the insulating blocks 163 and 164. It will be noted that transformer 207 is energized and current supplied to coil 160 as soon as the on-off switch 176 is closed; thus the reed is immediately placed in operation and may be adjusted with the switch 45 open.

*Starting and speed controls.*—In the operation of tracing devices of the general type disclosed herein in connection with cutting torches it is the usual practice to preheat the work by means of the torch, then turn on the high pressure oxygen, start the cut a short distance from the boundary of the shape to be cut and proceed in a straight line to the boundary. This type of operation requires that the steering motor and the automatic steering circuits be inoperative until the tracer 86 contacts the pattern and then be operative until the start-stop switch is opened at the end of the cut.

To carry out this mode of operation, the circuits are arranged so that when the start-stop switch 45 is closed the driving motor is energized through the speed control circuit to be described below, the solenoid valve 212, which controls the high pressure oxygen, is energized and opened and at the same time the cathode of thyratron 213 is connected to the secondary of transformer 214 through contacts 215 and 216 of relay 195. The cathode of thyratron 213 is also connected to the cathode of thyratron 189 at the center point 217 of resistor 197. The control grid for thyratron 213 is connected through the usual grid protective resistor to the grid connection 218 of thyratron 189. Thus, the firing of tube 213 is controlled by the same circuits that control the firing of tube 189, and when the reed 156 is moved to a position with respect to finger 146 to cause tube 189 to fire, tube 213 will also fire. In so doing, the relay 195 is energized thereby closing the circuit through contacts 194 and energizing the armature of steering motor 42. When relay 195 is energized the circuit is closed between contacts 219 and 216 before the circuit between contacts 215 and 216 is open. This locks the relay in and cuts thyratron 213 out of the circuit, the coil of the relay being connected across the secondary of transformer 214.

It will be noted that thyratron 189 is the thyratron that is responsive to increasing pressure against tracer 86 and energizes the steering motor to steer away from the center of the pattern. Thus, so long as there is no pressure against tracer 86, the springs 131 and 139 hold the tracer head deflected in a direction toward the pattern with the actuator plate 137 and collar 130 depressed so that the reed will not make contact with the finger 147; accordingly, the thyratrons 189 and 213 do not fire as long as the tracer 86 is out of contact with the pattern. However, as soon as the tracer contacts the pattern and the head 85 is moved to vertical or null position, tubes 189 and 213 both fire and automatic control of the steering motor is initiated immediately. The automatic control is maintained until the start-stop switch 45 is opened at which time the relay 195 drops out because transformer 214 is deenergized.

For proper cutting operation, accurate control of the speed of the drive motor is required through a wide range of speeds, preferably from 2 inches to 32 inches per minute. To accomplish this control, condenser 220 is charged by a reference voltage produced by rectifier 221. The grid of thyratron 222 which supplies the armature voltage for motor 41 is made positive by the setting of potentiometer 223. The armature voltage is connected to oppose the reference voltage on condenser 220, and thus tube 222 is held non-conducting whenever the armature voltage exceeds the reference voltage. In order to smooth the control and reduce the effect of transients, a small phase shift voltage produced by the transformer 224 and phase shift circuit 225 is connected in series with the two voltages and a filter 226 is connected across the armature.

The starting and speed controls above described are substantially the same as those described in somewhat greater detail in my aforesaid application.

*Summary of operation*

The mode of operation of the steering mechanism will be apparent from a consideration of the diagrams making up Figures 15, 16, 17 and 18. In these diagrams, the supports 11 and 12, arms 13 and 14, link 15, arms 21 and 22, supporting bar 26, torch 27 and the tracer apparatus 29 are shown diagrammatically with certain of the parts enlarged and others reduced for convenience in illustration with the result that the diagrams do not illustrate the parts either to scale or in proportion. The pattern engaging portion 128 of the tracer is greatly enlarged as are the dimensions $a$ and $b$ which represent the rearward offset of the drive wheel with respect to its axis and the forward eccentricity of the pattern engaging portion 128 with respect to the axis $x$ of the steering motor shaft 71, respectively. In Figure 15, the full lines show the position of the parts with the portion 128 of the tracer in contact with the edge of a pattern P, the tracer being mounted, as previously described, for rocking movement about the axis provided by the trunnions 111. The drive wheel 50 is in contact with the pattern support at the distance $a$ behind the center of the shaft 47 of the drive motor which coincides with the axis of the concentric sleeve 57, this being the axis about which the drive wheel and its housing 56 are swung in order to steer the apparatus.

For convenience of illustration, the point $y$ in these figures is located at the same perpendicular distance from the pattern engaging flat surface 129 of the portion 128 of the tracer as the center $c$ of the circular portion of 128, and the kerf width is twice this distance. Point $y$ coincides with the axis $x$ of the steering motor shaft 71 so long as the steering motor shaft, and hence the entire tracer apparatus, is in correct relationship to the pattern P, i. e., with the tracer head in neutral position. Assume, however, that because of a change in the shape of the pattern, an externally applied force or vibration or any other reason the edge of the pattern becomes positioned relative to the shaft 71 as shown at P' in Figure 15; i. e., an error occurs by reason of the axis $x$ of the steering motor shaft 71 being too far away from the pattern; this permits the tracer head to rock about the trunnions 111 (in a counterclockwise direction in Figures 2 and 5) to move the pattern engaging portion 128 of the tracer to the position shown in dotted lines in Figure 15, the weight of the head and the action of the springs 131 and 139 maintaining the flat surface 129 in engagement with the pattern. Because of the angle at which the trunnions are disposed, this swinging movement is slightly forward as well as toward the center of the pattern. The swinging movement of the tracer head brings contact 152 on contact arm 146 closer to contact 154 of the vibrating reed and through the electrical circuits just described, gives a signal to the steering motor which steers the drive wheel 50 to cause the center of shaft 71 to approach the pattern. Figure 15, however, shows the condition that exists before any steering movement has taken place. The previously described electrical circuits are such that the strength of the correcting signal varies with the extent of the original error E, which is the distance between the point $y$ in its new position and the axis $x$ measured in a direction normal to the edge of the pattern, the position of axis $x$ determines the location of the cutting torch through the pantograph.

One theoretical instantaneous position of the parts after the correcting signal has been given is shown in Figure 16. Here, in response to the signal, the steering motor, through the connection afforded by the sheave 72 on the steering motor shaft, the belt 74, sheave 75 and sleeve 57, has rotated the housing 56 of the drive wheel 50 about the axis of shaft 47 and sleeve 57 through the angle $w$; and the shaft 71 of the steering motor, the trunnions 111 and the tracer 128 have been rotated through a corresponding angle but the entire tracer head is considered not to have moved any appreciable distance in the new direction determined by the position to which the drive wheel housing has been rotated. (It will be understood that in actual operation, steering rotation of the parts takes place almost simultaneously with the occurrence of a deviation from the pattern and that the apparatus is advanced continuously by the drive wheel. In Figures 15, 16, 17 and 18 the several steps are considered separately for convenience of illustration and explanation.) In this position, not only is the direction of travel of the assembly changed as indicated by the arrow to steer the entire assembly toward the pattern, but also the offset $a$ between the point of contact $f$ of the drive wheel and the center of shaft 47 acts to move the entire tracer apparatus, and correspondingly the torch 27, inwardly toward the center of the pattern along an arc about the point of contact $f$ as a center. The amount of this inward bodily movement from the original line of travel L of the tracer head is shown by the dimensions $d$ in Figure 16.

This action immediately moves the center $x$ of the shaft 71 closer to the pattern, rocking the tracer head on the trunnions 111 toward the null position so that the total original error E is reduced by the distance $d$, leaving the point $y$ of the tracer out of alignment with center $x$ of the shaft 71 by the distance E' which is now the primary error between the locus of the cut and the edge of the pattern and which distance determines the strength of the correcting signal. However, the shape of portion 128 is such that rotation of the tracer increases the distance between point $y$ and the point of contact of portion 128 with the edge of the pattern by a distance indicated by dimension $e$. This constitutes the secondary error which added to the primary error E' measures the total error in the relationship between the center of shaft 71 and the edge of the pattern. It will be noted that because of the bodily movement of the entire assembly in the desired direction and because of the shape of the pattern engaging portion of the tracer, the distance between the point $y$ and the center $x$ of the shaft 71 is substantially reduced in Figure 16 as compared to Figure 15. Inasmuch as the strength of the correcting signal given to the steering motor is proportional to this distance, the reduction reduces the correcting signal and thus tends to eliminate over-correction.

Figure 17:
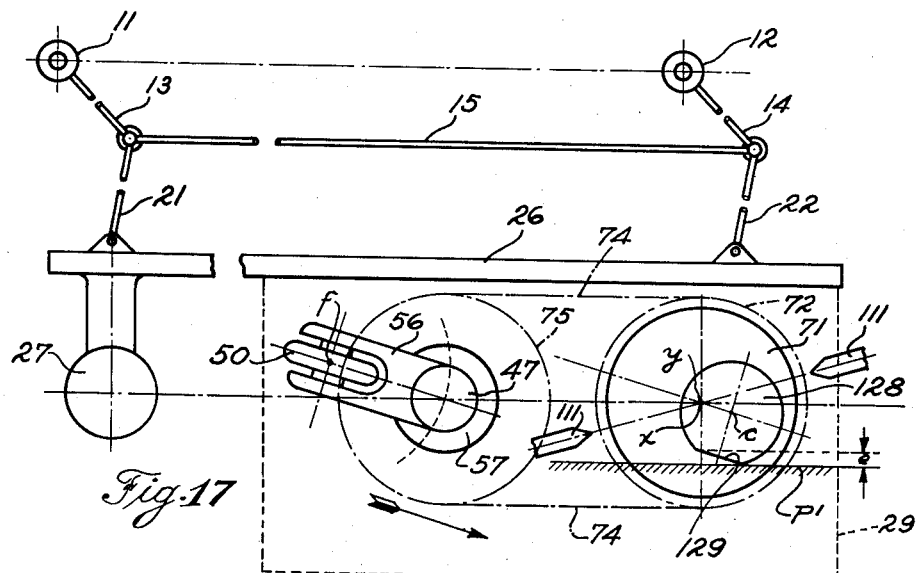

Figure 17 shows a further phase in the correction. Here it is assumed that there has been no further rotation of trunnions 111, tracer 128 and housing 56, but that the drive wheel has driven the assembly along the same direction as shown in Figure 16 toward the pattern until the point $y$ again coincides with the axis $x$ of the steering motor shaft. Thus the primary error has been entirely eliminated, leaving only the secondary error indicated by dimension $e$. In this condition, no correcting signal is being given to the steering motor but the tracer has not yet reached the desired correct relationship with the edge of the pattern because of the existence of the secondary error $e$. However, the drive wheel 50 is moving the entire tracer apparatus in the direction of the arrow; this motion moves the point $y$ to the other side of axis $x$, applying a steering signal to the steering motor which causes a gradual return of the tracer to the relationship to the pattern shown in full lines in Figure 15, the secondary error being eliminated by rotation of the steering motor shaft and tracer to a position in which the flat surface 129 is parallel to and in engagement with the edge of the pattern.

It is to be noted that the secondary error $e$ is due to the shape of the portion 128 of the tracer and is damping in its effect. That is, rotation of the tracer by the steering motor produces a decrease in the operating corrective torque before the correction has been completed, thus preventing over-travel. It will be evident that the same type of response occurs for either direction of corrective rotation. For corrections away from the center of the pattern, the rear portion of 128 engages the edge of the pattern, decreasing the distance from the point $y$ to the point of contact with the pattern as compared to the distance from the point $y$ to the flat 129.

Figure 18:
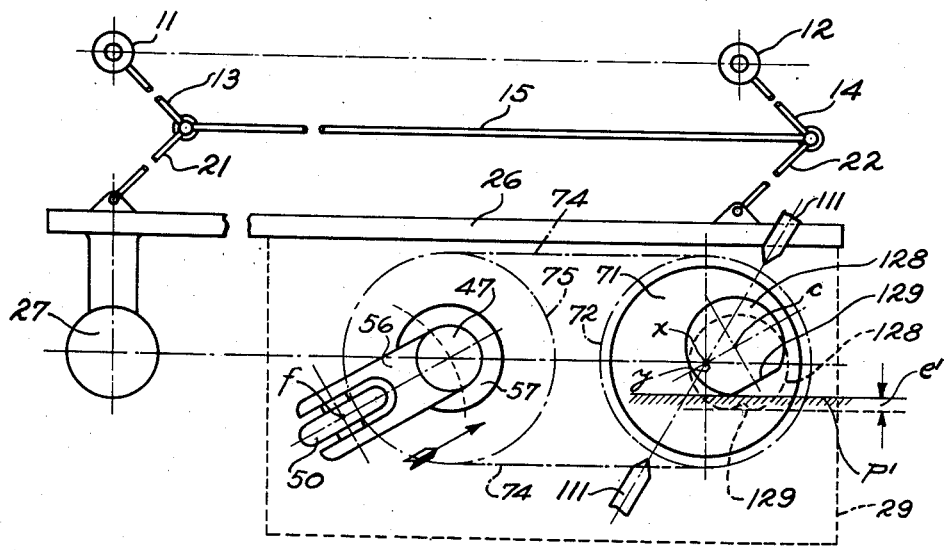

This condition is shown in Figure 18 which is similar to Figure 17 except that the correction is in the opposite direction. In Figure 18 the steering motor has operated to move and steer the apparatus away from the center of the pattern, and the correction has been carried out sufficiently to bring the points $x$ and $y$ into alignment with each other; that is, the primary error has been eliminated, leaving only the secondary error $e'$ which is due to the difference between the distance between the point $y$ and the point of contact of the portion 128 with the pattern, and the distance between the point $y$ and the flat 129. The dotted line indication of the portion 128 in Figure 18 illustrates this difference in distances. As the apparatus moves in the direction of the arrow in Figure 18, the point $y$ moves to a position between the axis $x$ and the edge of the pattern, applying a steering signal to cause a gradual return of the parts to their correct relationship as shown in Figure 15, the secondary error of Figure 18 being gradually eliminated just as a secondary error in the opposite direction shown in Figure 17 is eliminated. The shape of the portion 128 is such that the secondary error increases with the size of the correction made by the steering motor and therefore with the acceleration developed in the apparatus. Thus, damping effect is increased as the need for damping increases.

It will be understood that the same sort of action takes place when the rocking movement of tracer head 85 is caused by a curve in the pattern being followed; the bodily movement of the entire apparatus resulting from the offset $a$ of the driving wheel causes the apparatus immediately to follow the curve in the pattern while again the damping action brought about by the rotation of the tracer prevents overcontrol. The speed of the correction and the amount of the damping action, of course, depend upon the shape of the pattern. If the curve continues, correcting impulses are given to the steering motor until the tracer reaches the end of the curve at which time the damping action takes place and overcorrection is prevented.

It is to be noted that in the normal tracing position as shown in Figure 15, the point $y$ of the tracer is not in advance of the center $x$ of the steering motor shaft which defines the locus of the cut. Because of this, it is ordinarily unnecessary to compensate the template to make the apparatus trace the desired pattern.

To summarize, with the present apparatus an error or deviation from the pattern results first in the application of a relatively strong current to the steering motor to move the tracer head bodily and steer it in the desired direction. The primary error is taken up rapidly by a large application of power. However, the power supplied to the steering motor is throttled before the correction is completed because of the secondary error introduced by the shape of the tracer. The secondary error is corrected gradually, is necessarily small because of the shape of the tracer and is corrected by small applications of power near the null position of the apparatus. The compound action of the offset drive wheel and asymmetric tracer makes possible a prompt response and yet prevents overcorrecting and hunting and results in a traced contour having high fidelity to the template which may be made to actual scale for all usual commercial flame cutting.

In Figures 15 to 18 the preferred relationship between the axis of the trunnions and the plane of the drive wheel 50 is shown. With the apparatus moving in the direction shown by the arrow, the 30° angle of the trunnions permits the tracer head 85 to rock outwardly in response to sharp counterclockwise curves in the pattern. Inward rocking of the tracer head can, of course, take place readily when a clockwise curve is encountered. It will be appreciated that the dimensions are greatly exaggerated in these figures of the drawings and that abnormally large corrections are indicated; the apparatus in fact is sensitive to very small change and is capable of duplicating a pattern to within 1/64 inch.

In placing the apparatus in operation, the proper initial adjustment of the contacts with respect to the reed is made by means of the adjustable insulators 163 and 164. Preferably the contact points 152 and 153 are adjusted to be about 0.010 inch from the contact points 154 and 155 on the reed with the reed stationary. If the response is too quick, this spacing may be increased; if it is too slow, the spacing should be decreased. The screw 123 is then set for the width of the cut to be made by the torch, the speed control knob 43 adjusted to the desired speed, and the torch moved to the edge of the workpiece with the driving wheel 50 pointed toward the pattern so that the apparatus will engage the edge of the pattern obliquely. Then, the torch is lighted to preheat the work in the usual manner, and when the work is properly preheated, the switch 45 is moved to starting position. This starts the apparatus toward the pattern and turns on the high pressure oxygen. The apparatus moves in a substantially straight line, or may be steered by the manual control handles 77 and 78 until the tracer 86 makes engagement with the edge of the pattern P. When this occurs the thyratron 213 fires, placing the apparatus in automatic operation whereupon the apparatus automatically follows the pattern until the switch 45 is thrown to stop position.

The apparatus may be used for manual tracing simply by steering the driving wheel with the handles 77 and 78 using the guide 79 to follow the pattern.

It will be noted that with this control, correcting impulses are applied to the steering motor with every half cycle of the alternating current supply. Thus, the correcting impulses are applied so rapidly that errors are corrected before they become of substantial size. The tracer follows the contour accurately, and the arrangement of offset drive wheel and offset tracer provides for prompt correction of errors and at the same time prevents overcorrection.

The apparatus which produces these desirable results is sturdy and mechanically simple; the electrical circuits are not complicated and embody well-known and proven components. The apparatus is substantially foolproof and may be operated by relatively unskilled personnel. The pattern following apparatus may be adapted to any ordinary type of pantograph or tracer mechanism. The patterns can be cut of cardboard, metal or other sheet materials and need not be kept clean. The patterns require no compensation but may correspond identically with the piece to be reproduced; hence they can be made by any person having knowledge of the template producing art. The delicate portions of the apparatus are all enclosed, the electronic tubes and associated circuit components being disposed in the control box 32; hence the apparatus may be used under the severe operating conditions ordinarily encountered in shops employing flame cutting and welding machinery.

Various changes and modifications in the apparatus may be made without departing from the spirit and scope of the invention. Therefore it is to be understood that the foregoing description is given by way of example and not by way of limitation. The scope of the invention is defined by the appended claims.

I claim:

1. In a contour following apparatus, a tracer head having a tracer adapted to engage a horizontally disposed pattern to be followed, said tracer head being mounted for rotation about a vertical axis and for rocking movement about a horizontal axis, a driving wheel for supporting said apparatus and driving the same around said pattern, means controlled by rocking movements of said tracer head for steering said driving wheel to cause said apparatus to follow said pattern with said tracer in contact therewith, means for rotating said tracer head about said vertical axis synchronously with the steering movements of said driving wheel, the pattern engaging tracer being eccentric with respect to said vertical axis and offset forwardly therefrom, whereby rotation of said tracer head in a direction to steer said apparatus toward the center of said pattern rocks said tracer head outwardly away from the center of said pattern and rotation in the opposite direction permits said tracer head to rock in the opposite direction.

2. Apparatus according to claim 1 wherein the horizontal axis about which the tracer head rocks is oblique to the plane of the driving wheel.

3. Apparatus according to claim 1 wherein the driving wheel engages a horizontal surface and the point of engagement of the driving wheel with said surface is behind the intersection of the steering axis of the drive wheel with said surface.

4. In a contour following apparatus, a tracer head having a tracer adapted to engage the edge of a horizontally disposed pattern mounted on a pattern support, said tracer head being mounted for rotation about a vertical axis and for rocking movement about a horizontal axis, means for driving said tracer head around said pattern, means controlled by rocking movements of said tracer head for steering said driving means, means operated by said steering means for rotating said tracer head about said vertical axis, means tending to rock said tracer head in a direction to hold said tracer in engagement with the edge of the pattern, the pattern engaging tracer having a pattern engaging portion eccentric with respect to said vertical axis and whereby rotation of said tracer head in a direction toward the center of said pattern causes the distance between said vertical axis and the point of contact of said tracer with the pattern to increase thereby rocking said tracer head outwardly away from the center of said pattern and rotation in the opposite direction causes said distance to decrease, thereby permitting said tracer head to rock in the opposite direction.

5. An apparatus according to claim 4 wherein the tracer is provided with a thin enlarged end portion adapted to be disposed between the pattern and the pattern support.

6. In a contour following apparatus, a tracer adapted to engage the edge of a pattern mounted on a pattern support, said tracer having a shank portion, a pattern engaging portion of reduced dimensions as compared to said shank and a thin enlarged portion at the opposite side of the reduced portion from the shank and adapted to be disposed between the marginal edge portion of the pattern and the pattern support, said reduced portion having a flat side surface adapted to engage the edge of the pattern and rounded front and rear surfaces, the tracer being supported for rotation about an axis eccentric to said reduced portion and extending with said reduced portion near the rear thereof, whereby rotation of the tracer toward the center of the pattern increases the distance between the edge of the pattern and said axis and rotation of the tracer away from the center of the pattern decreases the distance between the axis and the edge of the pattern.

7. In a pattern following apparatus, a support, a driving motor and a steering motor carried by said support with their shafts parallel and normal to the plane of the pattern to be followed, a tracer head having a tracer adapted to engage said pattern, said tracer head being mounted on trunnions supported by the shaft of said steering motor, a drive wheel supported by a housing rotatable about the axis of the shaft of said driving motor, driving connections between said driving motor shaft and said drive wheel and a one-to-one driving connection between said steering motor and said drive wheel housing whereby rotation of said steering motor synchronously rotates said tracer head and said drive wheel housing.

8. Apparatus according to claim 7 wherein the axis of the trunnions is oblique to the plane of the drive wheel to permit the tracer head to pivot about the trunnions in response to turns in either clockwise or counterclockwise directions in the pattern being traced.

9. Apparatus for automatically following a contour comprising a tracer adapted to engage said contour, a tracer head supporting said tracer and mounted for rocking movement in response to engagement of the tracer with the contour, means for driving said tracer and means for steering said driving means to cause the tracer to follow the contour comprising an electric steering motor and means for controlling said motor comprising a vibrating reed, contacts disposed on opposite sides of said reed, circuits leading from said contacts to said motor whereby when said reed engages one of said contacts said motor is energized to steer in one direction and when said reed engages the other of said contacts said motor is energized to steer in the opposite direction, and mechanical connections between said tracer head and said contacts for moving said contacts with respect to said reed in response to rocking movement of said tracer head resulting from variations in the engagement between said tracer and said contour, said connections including an actuator plate for controlling the position of said contacts with respect to said reed, and means including a link for translating rocking movements of said tracer head into movements of said actuator plate.

10. Apparatus according to claim 9 wherein said actuator plate carries adjustable stops for positioning said contacts with respect to said reed.

11. Apparatus for automatically following a contour comprising a carriage, a tracer mounted on the carriage and adapted to engage said contour, means for driving said carriage and means for steering said carriage to cause the tracer to follow the contour comprising an electric motor for steering said carriage, electronic relay means for controlling said motor, said electronic relay means including two electronic tubes, the current flowing through one of said tubes energizing the motor to steer the carriage toward the contour and the current flowing through the other of said tubes energizing the motor to steer the carriage away from the contour, means for supplying alternating current to the plate-cathode circuits of said tubes, and means for controlling the conduction of said tubes including a vibrating element vibrating in synchronism with said alternating current supply, contacts disposed on opposite sides of said vibrating element and engageable thereby, circuit connections to said contacts whereby one tube is made conductive when said vibrator engages one of said contacts and the other tube is made conductive when said vibrator engages the other of said contacts.

12. Apparatus according to claim 11 wherein the vibrating element is vibrated by a coil energized from said alternating current supply, the circuits including a phase shift bridge whereby the phasing of the vibrating element with respect to the alternating current supply can be varied.

13. Apparatus according to claim 11 wherein the vibrating element is a vibrating reed and the contacts are carried by spring fingers, there being operative connections between said fingers and the tracer for changing the relative positions of the spring fingers with respect to the reed.

References Cited in the file of this patent

UNITED STATES PATENTS

| Number | Name | Date |
|---|---|---|
| 512,719 | Kleritj | Jan. 16, 1894 |
| 978,486 | Reed | Dec. 13, 1910 |

(Other references on following page)

UNITED STATES PATENTS

| Number | Name | Date |
|---|---|---|
| 1,986,004 | Mackenson | Jan. 1, 1935 |
| 2,083,588 | Anderson | June 15, 1937 |
| 2,207,787 | Eberle | July 16, 1940 |
| 2,261,644 | Cockrell | Nov. 4, 1941 |
| 2,262,354 | Cates | Nov. 11, 1941 |
| 2,354,391 | McCourt | July 25, 1944 |
| 2,372,604 | Rosen | Mar. 27, 1945 |
| 2,373,332 | O'Neill | Apr. 10, 1945 |
| 2,421,827 | Boyd | June 10, 1947 |
| 2,437,243 | Curtis | Mar. 9, 1948 |
| 2,492,731 | Branson | Dec. 27, 1949 |
| 2,499,178 | Berry | Feb. 28, 1950 |

FOREIGN PATENTS

| Number | Country | Date |
|---|---|---|
| 702,468 | Germany | Feb. 8, 1941 |